United States Patent [19]

Imaino et al.

[11] Patent Number: 5,555,537
[45] Date of Patent: Sep. 10, 1996

[54] OPTICAL DATA STORAGE SYSTEM WITH MULTIPLE WRITE-ONCE PHASE-CHANGE RECORDING LAYERS

[75] Inventors: Wayne I. Imaino, San Jose; Hal J. Rosen, Los Gatos; Kurt A. Rubin, Santa Clara; Wade W.-C. Tang, San Jose, all of Calif.

[73] Assignee: International Business Machines Corporation, Armonk, N.Y.

[21] Appl. No.: 497,518

[22] Filed: Jun. 30, 1995

[51] Int. Cl.$^6$ .................. G11B 7/00; G11B 7/24; G11B 5/66

[52] U.S. Cl. .................. 369/109; 369/94; 369/100; 369/112; 369/286; 369/275.1; 369/275.4; 428/694 DE; 428/694 RL; 430/270.12; 430/273.1

[58] Field of Search .................. 369/109, 112, 369/103, 94, 275.1, 275.4, 286; 265/125; 359/9, 10, 11, 21, 12, 25; 428/694 DE, 694 RL; 430/270.12, 273

[56] References Cited

U.S. PATENT DOCUMENTS

| | | | |
|---|---|---|---|
| 4,090,031 | 5/1978 | Russell | 358/130 |
| 4,394,661 | 7/1983 | Peeters | 369/94 |
| 4,450,553 | 5/1984 | Holster et al. | 369/275 |
| 4,960,680 | 10/1990 | Pan et al. | 430/346 |
| 5,089,358 | 2/1992 | Taki et al. | 428/694 DE |
| 5,095,478 | 3/1992 | Taki et al. | 369/275.4 |
| 5,097,464 | 3/1992 | Nishiuchi et al. | 369/112 |
| 5,202,875 | 4/1993 | Rosen et al. | 369/94 |
| 5,368,986 | 11/1994 | Terao et al. | 369/275.4 |
| 5,381,401 | 1/1995 | Best et al. | 369/275.1 |
| 5,432,770 | 7/1995 | Yashima et al. | 369/100 |
| 5,449,590 | 9/1995 | Imaino et al. | 430/273 |

FOREIGN PATENT DOCUMENTS

59-210543  11/1984  Japan .................. G11B 7/24

Primary Examiner—Loha Ben
Attorney, Agent, or Firm—Thomas R. Berthold

[57] ABSTRACT

An optical disk drive uses an optical disk with spatially separated multiple phase-change WORM recording layers. The optical disk has a light transmissive substrate onto which the laser light is incident. The substrate supports at least two spatially separated multi-film recording stacks, each stack including an active recording layer of phase-change WORM material. The disk is either an air-gap structure wherein each recording stack is supported on a separate substrate and the substrates are separated by an air-gap, or a solid structure wherein a solid light transmissive spacer layer separates the recording stacks. Each of the recording stacks located between the substrate on which the laser light is incident and the farthest recording stack includes an active phase-change recording layer and an optical interference film in contact with the recording layer. The recording layer is made sufficiently thin to have good light transmissivity, but at this low thickness, without any other layers, is not sufficiently reflective to act as a recording layer with suitable servo and recording performance. The optical interference film in contact with the recording layer has a high index of refraction relative to the adjacent recording layer and spacer to increase the optical interference effect in the recording stack. The optical interference film optimizes the contrast, reflectivity and transmissivity of the recording stack. The optical interference film has low absorption so that laser light can pass through it to focus on a farther recording layer. This allows the farther recording layers to be written using reasonable laser power.

40 Claims, 7 Drawing Sheets

OPTICAL DATA STORAGE SYSTEM WITH MULTIPLE WRITE-ONCE PHASE-CHANGE RECORDING LAYERS

TECHNICAL FIELD

This invention relates generally to optical data storage systems and more specifically to such a system using an optical medium having multiple recording layers.

BACKGROUND OF THE INVENTION

Optical data storage systems, such as optical disk drives, allow the storage of large quantities of data on the optical medium. The data is accessed by focusing a laser beam onto the recording layer of the medium and then detecting the reflected light beam.

In write-once read-many (WORM) systems, the laser writes data by making permanent marks on the recording layer. Once the data is recorded onto the medium it cannot be erased. The data in a WORM system is detected as a change in reflectivity between the written marks and unwritten regions between the marks. In an ablative WORM system, the laser writes data by melting portions of the recording layer, resulting in physical pits in the recording layer.

In contrast to an ablative WORM system, a phase-change WORM system uses phase-change alloys as the recording material and the laser writes data by locally converting the phase-change media from one structural phase (e.g., amorphous) to a second structural phase (e.g., crystalline). This is done when the amorphous region is heated and maintained at or above its crystallization temperature, or alternatively melted and slowly cooled until the region is crystallized. The WORM function is achieved because the medium is designed so that the second structural phase does not convert back easily to the first structural phase. Another type of phase-change WORM system uses mixing or alloying of spatially separate metallic layers. During the write process, the laser heats a local region of the medium to cause inter-diffusion of the initially separate layers, resulting in a mixed alloy. The data in both types of phase-change WORM systems is detected as a change in reflectivity between a non-written region and a written region on the medium.

To increase the storage capacity of an optical disk, multiple recording layer systems have been proposed. An optical disk having two or more recording layers may be accessed at the different spatially separated recording layers by changing the focal position of the lens. Examples of this approach include U.S. Pat. Nos. 5,202,875; 5,097,464; and 4,450,553. One problem with using multiple recording layers in phase-change WORM disks is that the conventional WORM materials are highly absorptive of light. Multiple recording layer disks require that the intermediate recording layers between the disk surface onto which the laser light is incident and the last or farthest recording layer from that surface be light transmissive. Because the conventional phase-change and alloying WORM materials tend to absorb a high percentage of the light, it is not possible to write on the farther recording layers. If the intermediate recording layers are made thinner to make them transparent, they then lack sufficient reflectivity and/or signal contrast (the difference in reflectivity between the crystalline and amorphous phases of phase-change alloys) so that they fail to function as phase-change WORM recording layers.

Japanese published patent application 59-210543 by Morinaka describes a laminated optical media structure for multiplexed optical recording. The structure is illustrated with two individual light absorbing layers, without any immediately adjacent dielectric layers. The two light absorbing layers are not separated by a sufficiently thick spacer layer because the spacer layer is deposited by vapor deposition, which has too low of a deposition rate to form the spacing thickness needed for a multiple recording layer system.

What is needed is a multiple data surface system that provides a good signal from the recording layers closer to the incident laser light, as well as allowing writing and erasing with reasonable laser power on all recording layers.

SUMMARY OF THE INVENTION

The invention is a multiple recording layer phase-change WORM optical disk and disk drive. The disk has a light transmissive substrate onto which the laser light is incident. The substrate supports at least two spatially separated multi-film recording stacks, each stack including an active recording layer of phase-change WORM material. The disk is either an air-gap structure wherein each recording stack is supported on a separate substrate and the substrates are separated by an air-gap, or a solid structure wherein a solid light transmissive spacer layer separates the recording stacks. Each of the recording stacks located between the substrate on which the laser light is incident and the farthest recording stack includes an active recording layer and an optical interference film in contact with the recording layer. The recording layer is made sufficiently thin to have good light transmissivity, but at this low thickness, without any other layers, is not sufficiently reflective to act as a recording layer with suitable servo and recording performance. The optical interference film in contact with the recording layer has a high index of refraction relative to the adjacent recording layer and spacer to increase the optical interference effect in the recording stack. The optical interference film optimizes the contrast, reflectivity and transmissivity of the recording stack. The optical interference film is also non-absorbing so that laser light can pass through it to focus on a farther recording layer. This allows the farther recording layers to be written using reasonable laser power.

For a fuller understanding of the nature and advantages of the present invention, reference should be made to the following detailed description taken together with the accompanying drawings.

DESCRIPTION OF THE PREFERRED EMBODIMENTS

Figure 1:
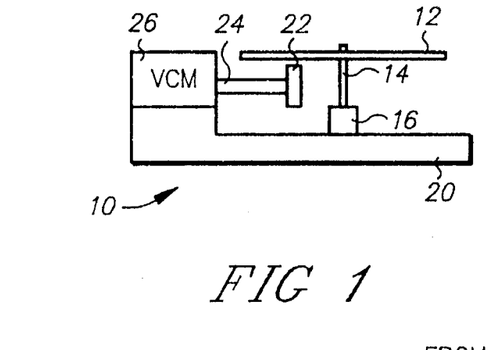
FIG. 1 is a schematic diagram of an optical disk drive system of the present invention with a multiple recording layer phase-change optical disk.

FIG. 1 is a schematic diagram of an optical disk data storage system according to the present invention designated by the general reference number 10. System 10 includes an optical data storage disk 12 which is preferably removably mounted on a clamping spindle 14 as is known in the art. Spindle 14 is attached to a spindle motor 16, which in turn is attached to a system chassis 20. Motor 16 rotates spindle 14 and disk 12.

An optical head 22 is positioned below disk 12. Head 22 is attached to an arm 24, which in turn is connected to an actuator device such as a voice coil motor 26. Voice coil motor 26 is attached to chassis 20 and moves arm 24 and head 22 in a radial direction below disk 12.

Figure 2A:
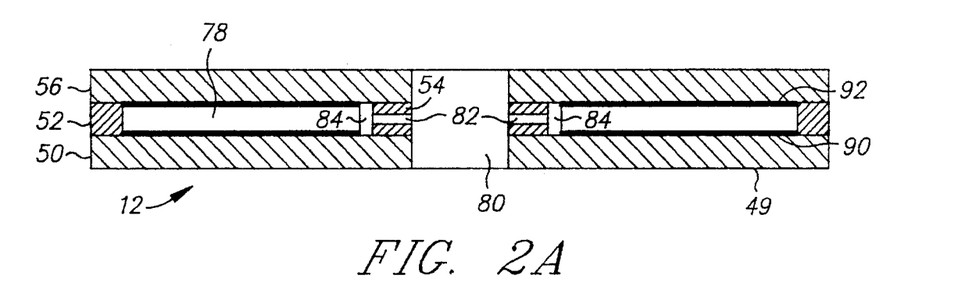
FIG. 2A is a cross-sectional view of an air-gap multiple recording layer optical disk.

FIG. 2A is a cross-sectional view of disk 12. Disk 12 has a substrate 50 having an outer face 49 onto which the laser beam is incident. An outer diameter (OD) rim 52 and an inner diameter (ID) rim 54 are attached between face plate 50 and a second substrate 56. Substrate 50 may be made of a light transmissive material such as glass, polycarbonate or other polymer material. Substrate 56 may be made of a similar material to substrate 50 or may be made of a material that is not transmissive of light in embodiments where the light does not have to pass through the substrate 56. In a preferred embodiment, substrates 50 and 56 are 1.2 mm thick. Substrate 50 has a thin film recording stack 90 and substrate 56 has a thin film recording stack 92. Recording stacks 90, 92 each contain a recording layer of an active phase-change WORM material and at least one transmissive dielectric layer and are described in detail below. The substrates 50, 56 have optical tracking grooves or marks and/or header information formed into the surfaces adjacent to recording stacks 90, 92, respectively, by injection molding, a photo-polymer process or an embossing process. Alternatively, the tracking features may be pits formed in the substrates or recorded marks in the recording layer. The OD and ID rims 52, 54 are preferably made of a plastic material and are approximately 300 microns thick. The rims 52, 54 may be attached to the substrates 50, 56 by glue, cement, ultrasonic bonding, solvent bonding, or other conventional bonding process. The rims 52, 54 may alternatively be integrally formed in the substrates 50, 56 during the substrate molding process. When in place, the rims 52, 54 form annular air gaps or spaces 78 between the substrates 50, 56. A spindle aperture 80 passes through disk 12 inside the ID rim 54 for receiving the spindle 14. A plurality of passages 82 are provided in the ID rim 54 connecting the aperture 80 and the spaces 78 to allow pressure equalization between the spaces 78 and the surrounding environment of the disk drive. A plurality of low impedance filters 84 are attached to passages 82 to prevent contamination of spaces 78 by particulate matter in the air. Filters 84 may be quartz or glass fiber. Passages 82 and filters 84 could alternatively be located on the OD rim 52.

Figure 3:
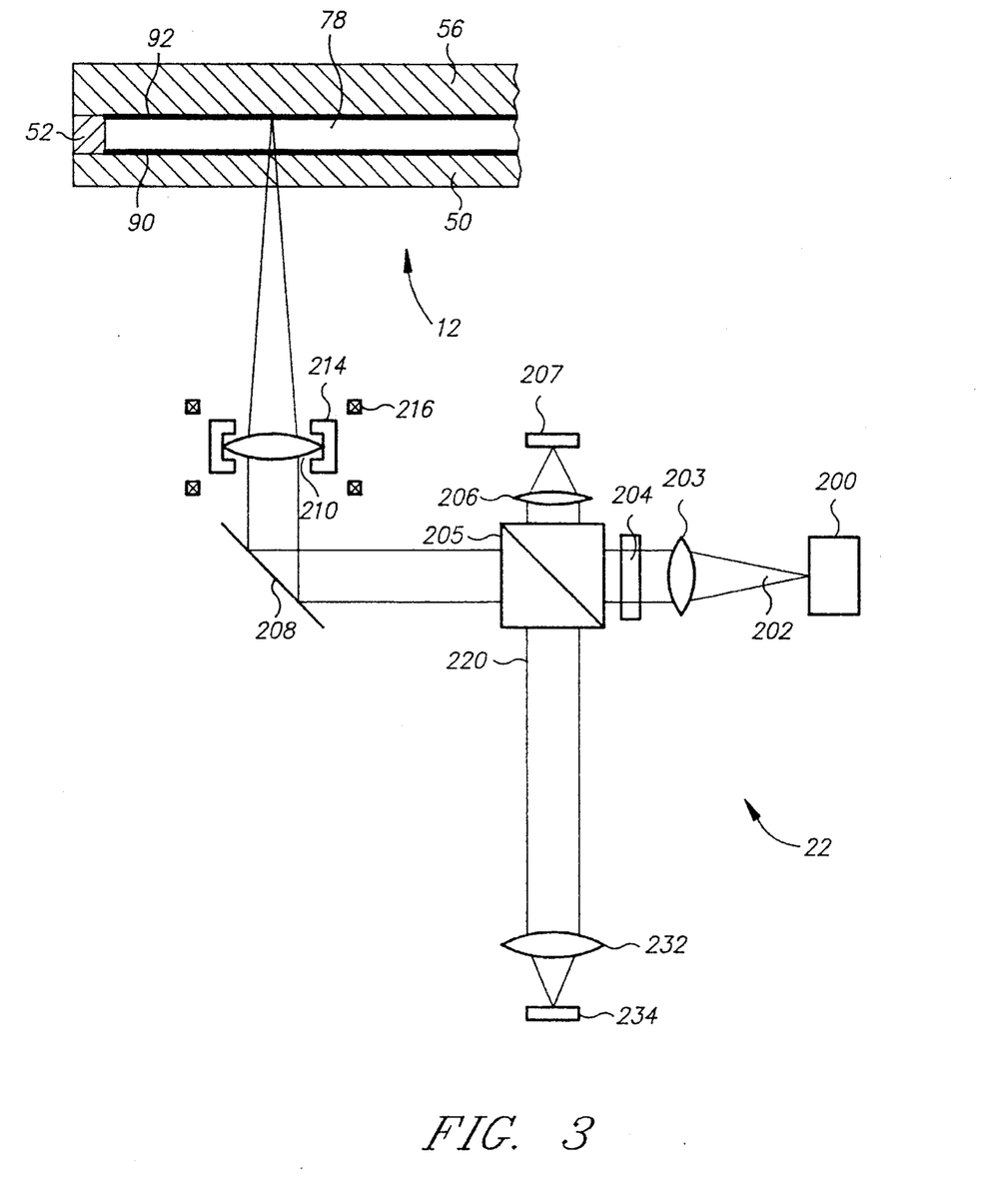
FIG. 3 is a schematic diagram of the optical head and optical disk, in the form of a two recording layer air-gap structure, of the optical disk drive system.

FIG. 3 shows a schematic diagram of one embodiment of the optical head 22 and disk 12. Optical head 22 includes a laser diode 200, which may be a gallium-aluminum-arsenide diode laser producing a primary beam of light 202 at a fixed wavelength. Laser diode 200 is capable of operating at at least two power levels, i.e., a first write power level that is high enough to cause the active recording layers to change phase and a second lower read power level for reading the data by reflection from the amorphous and crystalline phase regions in the written recording layers. Beam 202 is collimated by lens 203, circularized by circularizer 204, and then passes to a beamsplitter 205. A portion of beam 202 is reflected by beamsplitter 205 to a lens 206 and an optical detector 207. Detector 207 is used to monitor the power of laser beam 202. Beam 202 from beamsplitter 205 next passes to and is reflected by a mirror 208. Beam 202 then passes through a focus lens 210 and is focused to a diffraction-limited spot onto one of the recording stacks 90, 92. Lens 210 is mounted in a holder 214, the position of which is adjusted relative to disk 12 by a focus actuator motor 216, which may be a voice coil motor. Movement of the lens 210 by the focus actuator motor 216 moves the focused spot between the two recording stacks 90, 92 on the substrates 50, 56 of disk 12.

A portion of the light beam 202 is reflected from a recording stack 90, 92 as a reflected beam 220. Beam 220 returns through lens 210 and is reflected by mirror 208. At beamsplitter 205, beam 220 is directed through an astigmatic lens 232 and onto a multielement optical detector 234.

Figure 4:
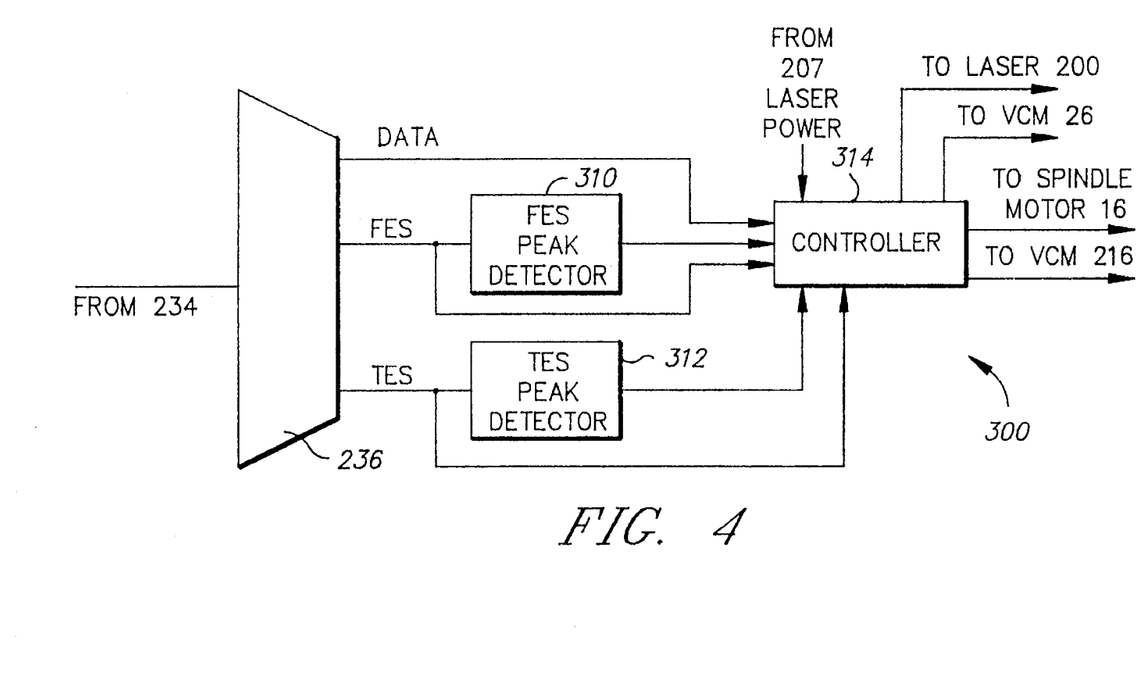
FIG. 4 is a block diagram of a controller system of the optical disk drive system.

FIG. 4 is a block diagram of a controller system of the optical disk drive system and is designated by the general reference number 300. The multielement detector 234 (FIG. 3) generates output signals that provide a data signal, a focus error signal (FES), and a tracking error signal (TES). These signals are amplified by signal amplifier 236 and sent directly to controller 314. A peak detector 310 also receives the FES, and a peak detector 312 also receives the TES from amplifier 236. Controller 314 also receives input signals from FES peak detector 310, TES peak detector 312, and laser power detector 207. Controller 314 is a microprocessor-based disk drive controller. Controller 314 is also connected to and controls the laser 200, head motor 26, spindle motor 16, and focus actuator motor 216.

Figure 2B:
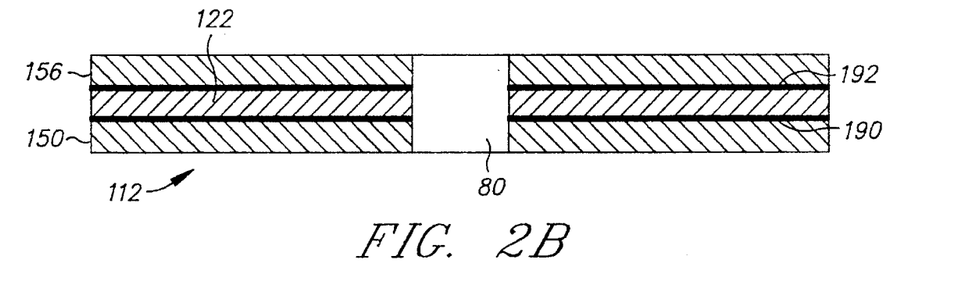
FIG. 2B is a cross-sectional view of a dual substrate laminated multiple recording layer optical disk.

FIG. 2B is a cross-sectional view of an alternative embodiment of a multiple recording layer recording disk 112 that may be substituted for disk 12 in system 10. Elements of disk 112 are similar to elements of disk 12 in FIG. 2A, but disk 112 does not have the rims and spacers of disk 12. Instead, a solid transparent spacer 122 separates the substrates 150 and 156. In a preferred embodiment, the spacer 122 is made of a highly transmissive optical cement which also serves to hold the substrates 150 and 156 together. The thickness of spacer 122 is preferably approximately 20–300 microns. The recording stacks 190, 192 on respective substrates 150, 156 contain the WORM material.

Figure 2C:
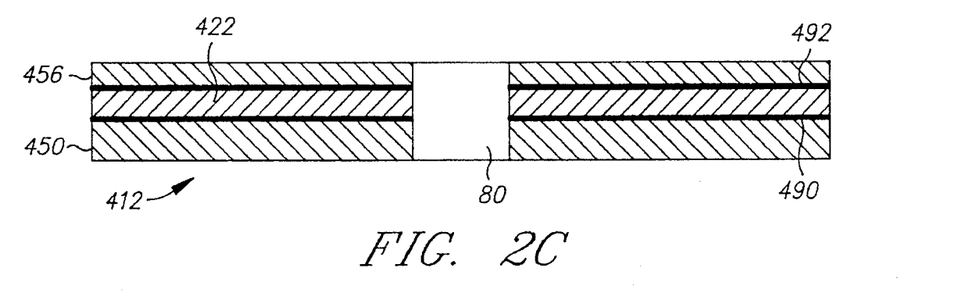
FIG. 2C is a cross-sectional view of a single substrate laminated multiple recording layer optical disk.

FIG. 2C is a cross-sectional view of another alternative embodiment of a multiple recording layer recording disk 412 that may be substituted for disk 12 in system 10. Elements of disk 412 are similar to elements of disk 112 in FIG. 2B. However, disk 412 does not use two separate substrates as in the previous embodiments (e.g., substrates 150, 156 in FIG. 2B), but instead builds a multilayer structure from a single substrate 450. The WORM recording stacks 490, 492 are separated by a solid spacer layer 422. Spacer layer 422 is a light transmissive layer formed by either lamination or deposition (such as a photo-polymer process or spin coating) over recording stack 490 on substrate 450. In a preferred embodiment, the light transmissive spacer layer 422 is made of a polymer material such as polycarbonate. The top surface of layer 422 has tracking grooves and/or header information formed into its surface by either a photo-polymer process or embossing. The second WORM recording stack 492 is then deposited on top of spacer layer 422. A final protective layer 456 of polymer material, such as ultraviolet (UV) radiation curable spin-coated acrylate, or polycarbonate with adhesive coating, is then formed onto recording stack 492.

Figure 2D:
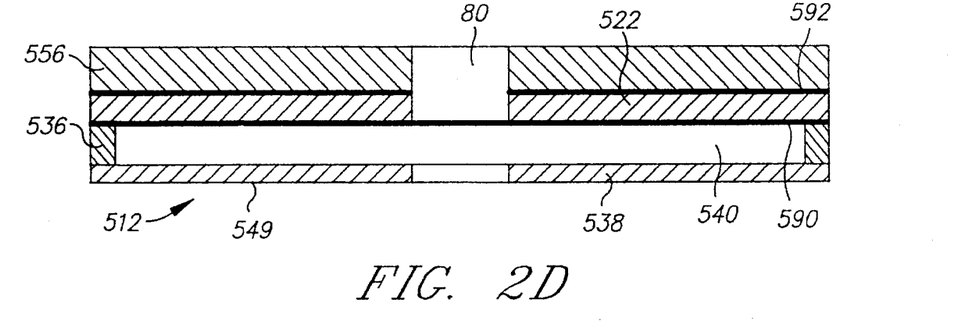
FIG. 2D is a cross-sectional view of a laminated multiple recording layer optical disk with a protective dust cover serving as the substrate spaced from the first recording layer by an air gap.

FIG. 2D is a cross-sectional view of another alternative embodiment of a multiple recording layer recording disk 512 that may be substituted for disk 12 in system 10. In this embodiment the disk 512 includes a solid disk blank 556. A WORM recording stack 592 is deposited onto disk blank 556 and forms the recording stack farthest from the incident laser light. A solid spacer layer 522 is formed over recording stack 592 and the first WORM recording stack 590 nearest to the incident laser light is formed on spacer layer 522. A protective coating such as UV curable photopolymer may be formed on recording stack 590 by a spin-coating process. A plastic ring 536 is bonded to spacer layer 522 and extends around the outer perimeter of spacer layer 522. The ring 536 supports a transparent plastic dust cover 538. The dust cover 538 is typically 100 microns thick and is stretched across and bonded to ring 536. Dust cover 538 has an outer face 549 onto which the laser beam is incident. The dust cover 538 forms an air-gap 540 of 0.2–2.0 mm between it and the first recording stack 590. The disk blank 556 is preferably made of solid material with a smooth surface, such as an aluminum alloy. The spacer layer 522 is a spin-coated and UV- or thermally-cured photo-polymer film with a typical thickness of 10–150 microns. The dust cover 538 is made of a transparent polymer material such as polycarbonate.

The detailed description of the multiple WORM recording layers and their method of fabrication will be described below with respect to the disk structure of FIG. 2A. However the multiple WORM recording layer system of the present invention is also operable with any of the other disk structures shown and described in FIGS. 2B–2D.

Figure 5:
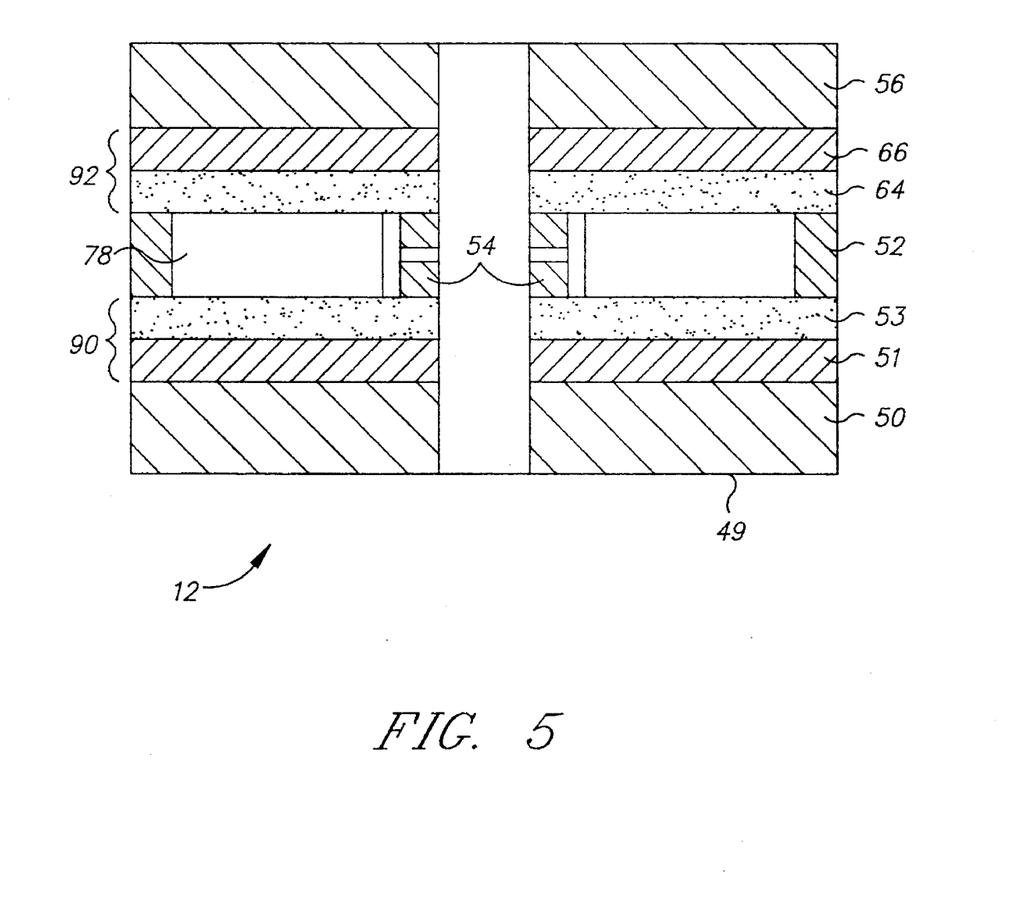
FIG. 5 is a cross-sectional view of an air-gap multiple recording layer optical disk illustrating the multiple recording layers with adjacent optical interference films according to a preferred embodiment of the present invention.

FIG. 5 is a cross-sectional view of the optical data storage disk 12 with multiple phase-change WORM active recording layers 51 and 66. Disk 12 has a substrate 50 having an outer face 49 onto which the laser beam is incident. Substrate 50 is preferably made of polycarbonate, amorphous polyolefin (APO), polymethylmethacrylate (PMMA), or glass and is non-absorbing at the recording wavelength. Substrate 50 is preferred to have a thickness of 1.2 mm but other thicknesses can be used. Pre-addresses and pre-grooves for the tracking servo of the laser light beam may be formed on the surface of substrate 50 opposite outer face 49. A recordable thin film 51 of active phase-change WORM material is deposited by sputtering or evaporation on substrate 50. The preferred material is a phase-change type alloy of $A_xSn_ySb_z$ (3%<x<45%; 1%<y<40%, 45%<z<96%; and x+y+z=100%) of thickness 2 to 15 nm, where A can be In, Cr, Bi, Si, and other transition metals. This type of phase-change alloy is described in U.S. Pat. No. 4,960,680. However, as described in that patent, the material is a single layer with a thickness of at least approximately 20 nm. If this material is thicker than 20 nm, its light transmissivity is less than 15%. Thus the material at the conventional thickness is not suitable for multiple recording layer optical disks which requires transmissivity greater than approximately 35%, which can only be achieved for thicknesses less than approximately 7.5 nm. Further, a mere reduction of thickness to less than 7.5 nm to increase light transmissivity causes other problems. For thicknesses less than approximately 7.5 nm, the reflectivity of the amorphous and crystalline phase is too low to assure accurate focusing and tracking, or reading of data with a low error rate. Also, such a thin phase-change layer is susceptible to corrosion if not protected.

In the present invention, one or more additional films, such as optical interference film 53, is deposited in contact with recording layer 51. By use of the optical interference effects of thin films, the transmissivity, reflectivity, and absorptivity of the multi-thin film recording stack 90 (active recording layer 51 and film 53) can be adjusted by varying the individual layer thicknesses. Film 53 and recording layer 51 together form an interference structure. Constructive interference occurs if the thickness of film 53 is properly selected, based on its thickness and the real part (n) of its index of refraction. A large difference in the value of n for film 53 relative to the indices of refraction of its adjacent layers (recording layer 51 and air) increases the interference effect for a given film thickness and will optimize the signal contrast and the reflectivity of the recording stack 90. Optical interference film 53 should also have low absorption (low imaginary part of its index of refraction, i.e., low extinction factor k) so that when the light spot is focused on second recording layer 66 it will transmit through recording layer 51 and film 53 with minimal absorption. Dielectrics such as $SiO_x$, $TiO_x$, $ZrO_x$, $Cu_xO$, SiN, SiC, amorphous Si, or organic polymers and the like are preferred for optical interference film 53, and can be deposited by sputtering, evaporation or spin coating on active recording layer 51. Other suitable materials for optical interference film 53 are oxides and nitrides of an element selected from the group consisting of Al, Ti, Zr, Cu, Hf, Ta, Nb, Cr and W. Dielectrics such as Zn and Cr mixed with one or more of S, Se and Te are also usable. These materials may be in the amorphous or crystalline phase. If in the amorphous phase, a wide range of compositions are allowable. For example, $SiO_x$ may have a composition with 1<x<2.1. The optical interference effects are calculated using standard thin film interference calculations as described, for example, in *Optical Properties of Thin Solid Films*, O. H. Heavens, Academic Press, 1955.

Another important characteristic of film 53 is low thermal conductivity. With an active recording layer 51 that has high transmissivity (i.e., low absorption), the write sensitivity of the phase-change material will not be as high as in a conventional thick highly absorbing phase-change layer. Therefore, with film 53 in contact with active recording layer 51, the thermal conductivity of film 53 should be small so as to reduce heat flow from the active recording layer 51 while the laser is at the write power level. In general, a non-absorbing material with a thermal conductivity less than 0.1 W/cm-K can be used for film 53. For example, $SiO_x$ has a thermal conductivity of 0.015 W/cm-K at 400 degK. The requirement of low thermal conductivity for film 53 can be relaxed if higher laser power is available. Dielectric film 53 also acts as a protective coating for thin active recording layer 51, which is especially desirable if the spacer between recording layers is an air gap.

A spacer layer 78 in the form of an air gap is adjacent to the optical interference film 53 and separates the two recording layers 51, 66. A layer 64 of a non-absorbing protective layer, such as a spin coated photo-polymer (UV-curable acrylate) may deposited on the second active phase-change recording layer 66. Because recording layer 66 can be thick, layer 64 may not be required either as a protective layer or to enhance the performance of recording layer 66. The second recording layer 66 is the last active recording layer in the multiple recording layer optical disk and does not have to be transmissive. Thus it can be of conventional thickness, e.g., 20–200 nm. With a thicker active recording layer 66 the absorptivity is higher, as compared to active recording layer 51. Therefore, the write sensitivity for layer 66 can be higher so the thermal conductivity of non-absorbing protective layer 64 is not as critical as for film 53. Thus, layer 64 can be selected from low absorption dielectrics such as those described above for layer 53 with a thickness from 10 nm to several microns. The stack 92 of second recording layer 66 and protective layer 64 are deposited on the second substrate 56. Substrate 56 can be formed of the same materials as substrate 50 or of opaque materials such as opaque plastic materials and metallic materials, such as aluminum.

In a preferred embodiment of optical disk 12, as shown in FIG. 5, with a laser operating at a 780 nm wavelength, substrates 50 and 56 are polycarbonate of 1.2 mm thickness. First active recording layer 51 is $In_{15}Sn_{20}Sb_{65}$ of 9 nm thickness. This film by itself transmits approximately 29% of the incident light and has a reflectivity of 13%. By depositing 150 nm of an optical interference film 53 of $SiO_2$ with n=1.5, the transmissivity of the stack 90 becomes 41% and the reflectivity is 20%. Such a phase-change WORM recording structure with a transmissivity greater than 35% and a reflectivity greater than 10% is required for reliable operation with good signal to noise with existing laser diode sources. The air-gap 78 is 200 microns thick. The second active recording layer 66 on substrate 56 is $In_{15}Sn_{20}Sb_{65}$ of 75 nm thickness. Protective layer 64 is a spin coated photo-polymer (UV-curable acrylate) of 2 microns thickness. If the laser light is of a shorter wavelength to reduce the spot size and thereby increase the recording density, adjustment of the thickness of recording layer 51 and film 53 is needed. For example, for laser light at a 500 nm wavelength, the thickness of film 53 is optimally 110 nm, with recording layer 51 having a thickness of 8 nm.

In a particular example of a two-layer disk similar to the above-described preferred embodiment according to the structure of FIG. 5, the active recording layers 51, 66 were formed of $In_{15}Sn_{20}Sb_{65}$ with the transparent dielectric layers 53, 64 formed of $SiO_2$. Layer 51 was 8 nm thick and sputter deposited on polycarbonate substrate 50. The dielectric layer 53 was sputter deposited to a thickness of 15 nm on layer 51. The second data layer 66 was 75 nm thick and sputter deposited on polycarbonate substrate 56. Protective layer 64 was 15 nm of $SiO_2$ sputter deposited on active layer 66. The two substrates were then bonded together to have an air-gap 78 with a thickness of 300 microns. The two recording stacks 90, 92 (recording layers 51, 66 and their associated optical interference layers 53, 64) had values of transmissivity, reflectivity and absorption as shown in Table 1 below:

TABLE 1

| Layer Number (See FIG. 5) | Thickness (nm) | Transmissivity (%) | Reflectivity (%) | Absorption (%) |
|---|---|---|---|---|
| 1 (51) | 8 | 44 | 17 | 39 |
| (LAYER 53) | 15 | | | |
| 2 (66) | 75 | 1 | 31 | 68 |
| (LAYER 64) | 15 | | | |

Figure 6A:
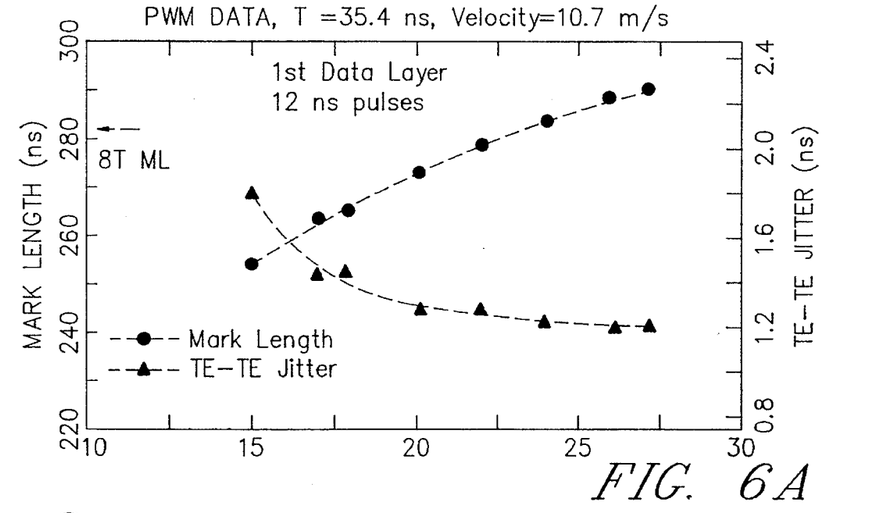
FIGS. 6A and 6B are graphs of readback data jitter and mark length as a function of laser write power for the first and second data layers, respectively, for a two recording layer disk according to the present invention.
Figure 6B:
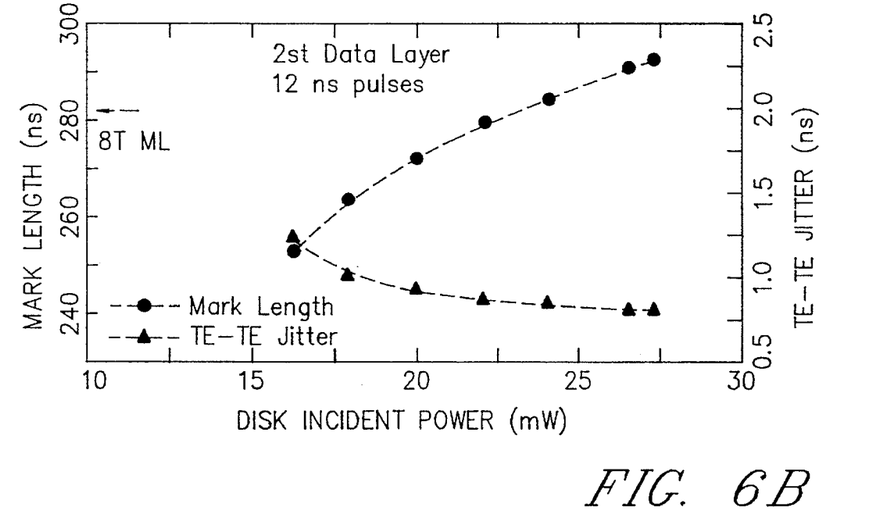

This two layer disk was tested on a dynamic test stand. A laser beam of 780 nm wavelength was focused through a 0.55 numerical aperture lens. The disk was rotated so that the local media velocity was 10.7 m/s. Laser pulses of 12 ns were used to record pulse width modulation (PWM) data of 8 clock cycles length. Each clock cycle ($T_c$) was 35.4 ns. FIGS. 6A and 6B are graphs of readback data of mark trailing edge to trailing edge (TE-TE) "jitter" for each of the two recording layers as a function of laser write power. Jitter is a measure of the deviation of the written mark transitions from their ideal locations on the disk. Low jitter at the correct mark length is important to ensure that data is read back with minimal errors. It is desirable to have the worst case jitter be less than five percent of $T_c$, which would be 1.8 ns in this case of a 35.4 ns clock. As shown in FIGS. 6A–6B, the readback data on both recording layers, at the correct mark length of $8T_c$=283.2 ns, exhibited low jitter of less than 1.2 ns. The write power needed to achieve this low jitter is less than 23 mW for both recording layers, which is achievable with presently available commercial lasers.

The preferred embodiment of the present invention has been described for an air-gap structure as shown in FIG. 2A, but is fully applicable with the other disk structures as shown in FIGS. 2B–2D.

Figure 7:
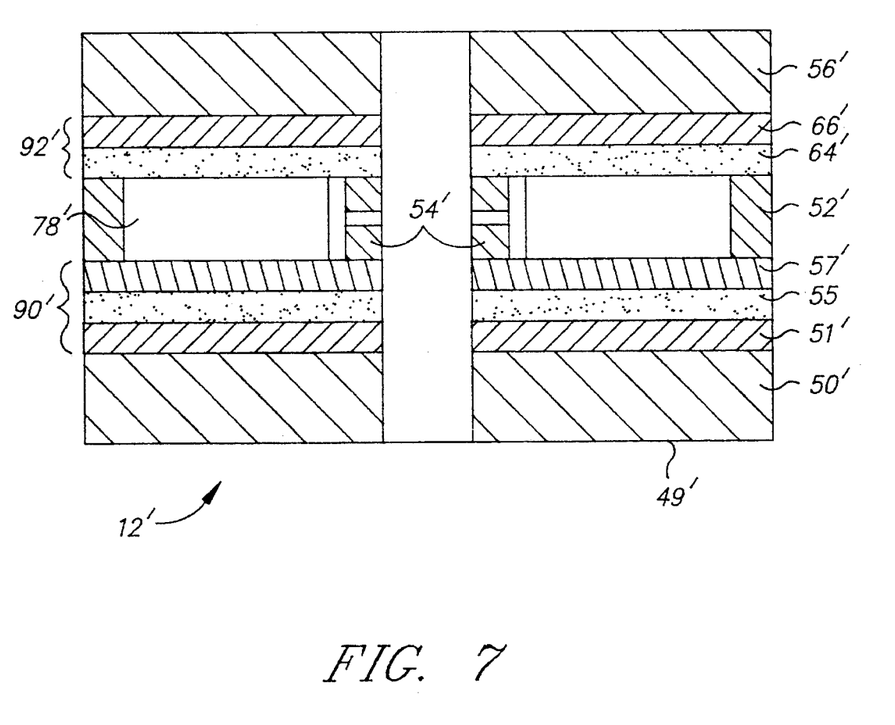
FIG. 7 is a cross-sectional view of an air-gap multiple recording layer optical disk illustrating the multiple recording layers with adjacent dual films according to an alternative embodiment of the present invention.

FIG. 7 is a cross-sectional view of another embodiment of the optical disk 12, designated 12'. Elements of disk 12' that are similar to elements of disk 12 are designated by a prime number. The first recording layer 51' has two light-transmissive films 55, 57 deposited on it in place of film 53 (FIG. 5). In certain cases where the choice of a high index of refraction and low thermal conductivity material is not available, for example due to difficult manufacturing requirements, double transparent thin films can then be used. Thus in disk 12' the function of single film 53 is accomplished by the combination of films 55, 57. Film 55 should have low thermal conductivity but not necessarily high n, whereas film 57 should have high n but not necessarily low thermal conductivity. Dielectrics such as $SiO_x$, $TiO_x$, $ZrO_x$, $Cu_xO$, or organic polymers and the like are preferred for film 55. Low absorption dielectrics such as those described above for layer 53 (FIG. 5) are preferred for film 57. The optical properties of recording layer 51' can be optimized by adjusting the thicknesses of layers 55 and 57. For example, $SiO_2$ with a thickness of 10–80 nm can be used for film 55 and $SiN_x$ with a thickness of 20–100 nm can be used for layer 57. Another change can also be made for second recording layer 66'. The thickness of protective layer 64' can be adjusted, making use of the optical interference effect, to maximize the signal contrast for the second recording layer 66'. $SiO_x$ may be deposited by evaporation or sputtering on active recording layer 66' to a thickness range of 50–200 nm. With this thin $SiO_x$ layer 64', the signal contrast increases by a factor of 1.3 to 2.2 as compared to an active recording layer 66' without any optical interference coating. This increase in contrast is useful where improved signal to noise is required as, for example, in the case of high-density, pulse-width-modulation (PWM) recording. Furthermore, the dielectric coatings 55 and 57 on recording layer 51' can be deposited on substrate 50' between the substrate and active recording layer 51' instead of on top of active recording layer 51'. This is because the placement of dielectric coatings between recording layer 51' and substrate 50' is sometimes desirable due to manufacturing issues such as adhesion of various layers.

Figure 8:
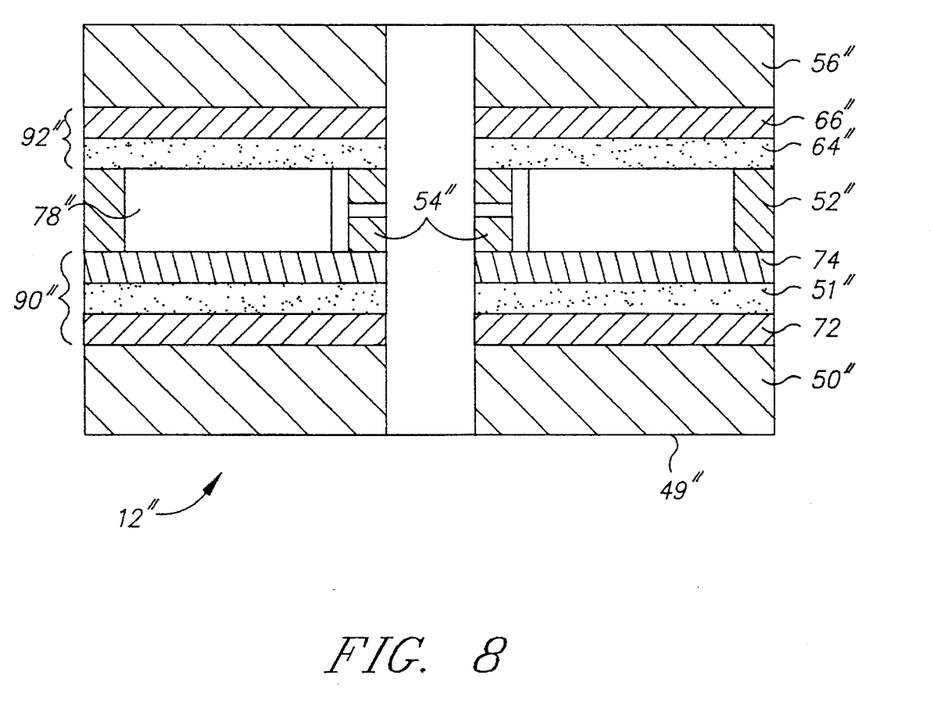
FIG. 8 is a cross-sectional view of an air-gap multiple recording layer optical disk illustrating the multiple recording layers with the first recording layer sandwiched between adjacent films according to an alternative embodiment of the present invention.

FIG. 8 is a cross-sectional view of another embodiment of the optical disk 12, designated 12". Elements of disk 12" that are similar to elements of disk 12 are designated by a double prime number. In a manner similar to optical disk 12' in FIG. 7, multiple recording layer WORM disk 12" has two non-absorbing films 72 and 74 near active recording layer 51". The difference is that the active recording layer 51" is sandwiched between non-absorbing films 72, 74. Dielectric film 72 is deposited directly on substrate 50", the active phase-change recording layer 51" is then deposited on film 72, and film 74 is then deposited on active recording layer 51". The laser light passes through the non-absorbing film 72 before it reaches the recording layer 51". This trilayer thin-film recording stack 90" also takes advantage of the optical interference effects to maximize performance. The function of films 72, 74 is identical to film 53 of disk 12 in FIG. 5. Thus, films 72, 74 should have low thermal conductivity and high n. The advantage of this structure over the structure of disk 12 is that under some high write power conditions, ablation of the recording layer may take place. Ablation in a phase-change medium is not desirable because it may increase error in the placement of data marks. With a sandwich structure as shown, the possibility of ablation in the recording layer is minimized. In a preferred embodiment of the structure of FIG. 8, with a laser operating at a wavelength of 780 nm, substrate 50" and 56" are polycarbonate of 1.2 mm thickness. First dielectric layer 72 is $SiO_2$ of 2 nm thickness. First active recording layer 51" is $In_{15}Sn_{20}Sb_{65}$ of 8 nm thickness. The second dielectric layer 74 is spin-coated UV-curable acrylate of 2 microns thickness. The air-gap 78" is 200 microns thick. The second active recording layer 66" on substrate 56" is $In_{15}Sn_{20}Sb_{65}$ of 75 nm thickness. Protective layer 64" is a spin-coated UV-curable acrylate of 2 microns thickness.

The present invention has been described and shown in the drawings for a multiple recording layer disk with only two recording layers. However, it is possible to have more than two recording layers. One or more additional recording layers and associated optical interference films can be located between the first and second recording layers. For example, if a third recording layer (and a second optical interference film in contact with it) is included in the preferred embodiment of FIG. 5, the first recording layer would be $In_{15}Sn_{20}Sb_{65}$ with a thickness of 7 nm and the first optical interference film would be $SiO_2$ with a thickness of 150 nm. The third recording layer would be $In_{15}Sn_{20}Sb_{65}$ with a thickness of 7 nm and the second optical interference film would be $SiO_2$ with a thickness of 150 nm. This would result in a transmissivity of 50% for each recording stack so that 25% of the laser light incident on the first substrate would reach the second or farthest recording layer.

In place of a phase-change type alloy of $A_xSn_ySb_z$, other material compositions that undergo an amorphous to crystalline transformation and have a reflectivity difference associated with those two structurally distinct states may be used for the phase-change WORM recording layers (51, 51', 51", 66, 66', 66"). A general principle guiding the choice of applicable compositions is that the materials be at or close to a stoichiometric composition. This is a composition at which little or no phase separation occurs during crystallization. This condition may be obtained for materials which crystallize into stable phases or metastable phases. Generally, those materials which crystallize the quickest are most applicable. Additionally, for materials that do not crystallize extremely fast, the thin film structure should be relatively insulating to reduce the cooling rate. This is to prevent the crystallized spot from converting back to the amorphous phase due to melting of the recording layer by the focused laser beam. This last requirement is to ensure that the material can only be written once. This means that there should not be a high thermal conductivity material, such as a metal layer, either in direct contact with the recording layer or separated from it by a thin (e.g., less than approximatley 30 nm) dielectric layer.

Among the materials which are most suitable binary compositions are GeTe, SnTe, PbTe, SbSe, $Sb_2Se_3$, $Sb_{(1-x)}Se$ with $0<x<0.4$, $Bi_2Se$, $Sbi_2Se_3$, $Bi_2Te$, BiTe, $Bi_2Te_3$, $Sb_2Te$, SbTe, $Sb_2Te_3$, TeSi, $Ag_2Se$, $AgSe_2$, $Ag_2Te$, $Ag_3Te_2$, $AgTe_2$, $Au_2Se_3$, $AuTe_2$, GaSb, and GeSe. Additionally, these compositions can be slightly off stoichiometry and crystallize extremely quickly by adding nucleating agents such as Ti, Pd or Cr. Ternary compositions suitable for phase-change WORM include compositions along the composition tie-line connecting GeTe with $Sb_2Te_3$ and in particular, $GeSb_2Te_4$, $Ge_2Sb_2Te5$, $GeSb_4Te_7$ or compositions along that tie line with small amounts of excess Sb, Ti, Pd, Sn or Cr. Other materials include $In_3SbTe_2$. Another material composition is $(InSb)_{1-x}(GaSb)_x$ where $0.5<x<=1$. Also active recording films such as sub-oxide films of the type $TeO_x$, $GeO_x$, $SbO_x$, and $InO_x$ with metallic additives (e.g., Pd, Ni, Cu) are also applicable. These suboxide systems also make use of the thermally-driven amorphous-to-crystalline phase transition as the recording mechanism. For each of these materials, new thicknesses for the non-absorbing layers 53, 55, 57, 64, 72, and 74 (and their primed counterparts) are determined based on the teaching described above.

The invention has been described in the embodiment of an optical disk drive. However, there are other types of optical data storage systems to which the invention is applicable. These systems usually have the feature that the medium upon which the data is stored can be removed. The common systems are those using optical media in the form of a tape or card. The drive associated with the tape or card moves the tape or card by translation, instead of rotation in the case of a disk, for the reading and writing of data. It is desirable to also increase the data storage capacity of optical tape and cards by use of multiple recording layers of phase-change WORM material. In the optical tape or card the multiple recording stacks may be supported on an opaque substrate and covered with a transparent protective layer onto which the laser light is incident. In this case the protective layer functions like the previously described disk substrate. Both the tape or card protective layer and the disk substrate are transparent members that have an outer surface onto which the laser light is incident and through which the laser light travels to the recording stacks.

While the preferred embodiments of the present invention have been illustrated in detail, it should be apparent that modifications and improvements may be made to the invention without departing from the spirit and scope of the invention as described in the following claims.

What is claimed is:

1. An optical data storage system comprising:
   a laser light source for generating laser light at a predetermined wavelength and at different read and write power levels;
   an optical medium comprising (a) a first member transmissive to the light and having a first surface that forms a medium outer face onto which the light is incident, (b) a first recording layer of phase-change write-once material spaced from the medium outer face by the member, (c) an optical interference film in contact with the first recording layer and transmissive to the light, the optical interference film having an index of refraction significantly different from the index of refraction of the first recording layer and a thickness sufficient to provide constructive interference of the light, the first recording layer and the optical interference film in contact with it being light transmissive, and (d) a second recording layer of phase-change write-once material spaced from the first recording layer;

a lens located between the laser light source and said first surface of the member for focusing the laser light to a spot; and means connected to the lens for moving the lens relative to the medium so the focused spot can be moved from one recording layer to another recording layer; whereby the light at the read power level is reflected back from the first recording layer and the optical interference film when the spot is focused on the first recording layer and the light at the write power level is transmitted through the first recording layer and the optical interference film in contact with it when the spot is focused on the second recording layer to change the phase of the material in the second recording layer.

2. The system according to claim 1 wherein the optical data storage system is an optical disk drive system, wherein the optical medium is an optical disk, and wherein the first member onto which the laser light is incident is a substrate.

3. The disk drive system according to claim 2 wherein the optical disk further comprises a spacer layer transmissive to the light and located between and separating the first and second recording layers by the thickness of said spacer layer.

4. The disk drive system according to claim 3 wherein the second recording layer is formed on the spacer layer.

5. The disk drive system according to claim 2 wherein the optical disk further comprises a second substrate and wherein the second recording layer is formed on the second substrate and the first and second substrates are spaced apart by an air gap.

6. The disk drive system according to claim 2 wherein the optical disk further comprises a disk blank and a ring attached to and extending around the outer perimeter of the disk blank, and wherein the substrate is a plastic dust cover supported by the ring.

7. The disk drive system according to claim 6 wherein the optical disk further comprises a spacer layer transmissive to the light and located between and separating the first and second recording layers, wherein the second recording layer is formed on the disk blank, wherein the first recording layer is formed on the spacer layer, and wherein the first recording layer and the plastic dust cover are separated by an air gap.

8. The disk drive system according to claim 2 wherein the first recording layer of the optical disk is formed on the surface of the first substrate opposite the disk outer face and wherein the optical interference film is formed on the first recording layer.

9. The disk drive system according to claim 2 wherein the optical interference film of the optical disk is formed on the substrate and the first recording layer is formed on the optical interference film.

10. The disk drive system according to claim 2 wherein the optical interference film of the optical disk has sufficiently low thermal conductivity to allow the first recording layer to retain heat from the focused spot at the write power level to thereby change phase.

11. The disk drive system according to claim 2 wherein the optical disk further comprises a low thermal conductivity film in contact with and located between the first recording layer and the optical interference film, the low thermal conductivity film allowing the first recording layer to retain heat from the focused spot at the write power level to thereby change phase.

12. The disk drive system according to claim 2 wherein the optical interference film is formed directly on the substrate and the first recording layer is formed on and in contact with the optical interference film and further comprising a second optical interference film formed on and in contact with the first recording layer; whereby the the two optical interference films and the intermediate recording layer form a trilayer film stack.

13. The disk drive system according to claim 2 wherein the phase-change material in the first and second recording layers of the optical disk is an alloy comprising A, Sn and Sb, where A is an element selected from the group consisting of In, Cr, Bi and Si.

14. The disk drive system according to claim 2 wherein the phase-change material in the first and second recording layers of the optical disk is a mixture of one or more oxides selected from the group consisting of $TeO_x$, $GeO_x$, $SbO_x$ and $InO_x$ and one or more metals selected from the group consisting of Pd, Ni and Cu.

15. The disk drive system according to claim 2 wherein the phase-change material in the first and second recording layers of the optical disk consists essentially of a material selected from the group consisting of GeTe, SnTe, PbTe, SbSe, $Sb_2Se_3$, $Sb_{(1-x)}Se$ with $0<x<0.4$, $Bi_2Se$, $Sbi_2Se_3$, $Bi_2Te$, BiTe, $Bi_2Te_3$, $Sb_2Te$, SbTe, $Sb_2Te_3$, TeSi, $Ag_2Se$, $AgSe_2$, $Ag_2Te$, $Ag_3Te_2$, $AgTe_2$, $Au_2Se_3$, $AuTe_2$, GaSb, and GeSe.

16. The disk drive system according to claim 2 wherein the phase-change material in the first and second recording layers of the optical disk consists essentially of a material selected from the group consisting of $GeSb_2Te_4$, $Ge_2Sb_2Te5$, $GeSb_4Te_7$, $In_3SbTe_2$, and $(InSb)_{1-x}(GaSb)_x$ where $0.5<x<=1$.

17. The disk drive system according to claim 2 wherein the optical interference film of the optical disk comprises an oxide, nitride or carbide of Si.

18. The disk drive system according to claim 2 wherein the optical interference film of the optical disk comprises an oxide or nitride of an element selected from the group consisting of Al, Ti, Zr, Cu, Hf, Ta, Nb, Cr and W.

19. The disk drive system according to claim 2 wherein the optical interference film of the optical disk comprises Zn or Cr mixed with one or more of the elements selected from group consisting of S, Se and Te.

20. The disk drive system according to claim 2 wherein the optical disk further comprises a third recording layer of phase-change write-once material located between the first and second recording layers and a second optical interference film in contact with the third recording layer and transmissive to the light, the second optical interference film having an index of refraction significantly different from the index of refraction of the third recording layer and a thickness sufficient to provide constructive interference of the light, the third recording layer and the second optical interference film in contact with it providing a light transmission of greater than approximately 25 percent, whereby the light at the write power level is transmitted through the third recording layer and the second optical interference film in contact with it when the spot is focused on the second recording layer to change the phase of the material in the second recording layer.

21. An optical data recording medium comprising (a) a first member transmissive to a laser light and having a first surface that forms a disk outer face onto which the laser light is incident, (b) a first recording layer of phase-change write-once material spaced from the member outer face by the member, (c) an optical interference film in contact with the first recording layer and transmissive to the light, the optical interference film having an index of refraction significantly different from the index of refraction of the first recording layer and a thickness sufficient to provide constructive interference of the light, the first recording layer and the optical interference film in contact with it being light transmissive, and (d) a second recording layer of phase-change write-once material spaced from the first recording layer.

22. The optical medium according to claim 21 wherein the optical medium is an optical disk and wherein the first member onto which the laser light is incident is a substrate.

23. The optical disk according to claim 22 further comprising a spacer layer transmissive to the light and located between and separating the first and second recording layers by the thickness of said spacer layer.

24. The optical disk according to claim 23 wherein the second recording layer is formed on the spacer layer.

25. The optical disk according to claim 22 further comprising a second substrate and wherein the second recording layer is formed on the second substrate and the first and second substrates are spaced apart by an air gap.

26. The optical disk according to claim 22 further comprising a disk blank and a ring attached to and extending around the outer perimeter of the disk blank, and wherein the substrate is a plastic dust cover supported by the ring.

27. The optical disk according to claim 22 further comprising a spacer layer transmissive to the light and located between and separating the first and second recording layers, wherein the second recording layer is formed on the disk blank, wherein the first recording layer is formed on the spacer layer, and wherein the first recording layer and the plastic dust cover are separated by an air gap.

28. The optical disk according to claim 22 wherein the first recording layer is formed on the surface of the first substrate opposite the disk outer face and wherein the optical interference film is formed on the first recording layer.

29. The optical disk according to claim 22 wherein the optical interference film is formed on the substrate and the first recording layer is formed on the optical interference film.

30. The optical disk according to claim 22 wherein the optical interference film has sufficiently low thermal conductivity to allow the first recording layer to retain heat from the focused spot at the write power level to thereby change phase.

31. The optical disk according to claim 22 further comprising a low thermal conductivity film in contact with and located between the first recording layer and the optical interference film, the low thermal conductivity film allowing the first recording layer to retain heat from the focused spot at the write power level to thereby change phase.

32. The optical disk according to claim 22 wherein the optical interference film is formed directly on the substrate and the first recording layer is formed on and in contact with the optical interference film and further comprising a second optical interference film formed on and in contact with the first recording layer; whereby the the two optical interference films and the intermediate recording layer form a trilayer film stack.

33. The optical disk according to claim 22 wherein the phase-change material in the first and second recording layers is an alloy comprising A, Sn and Sb, where A is an element selected from the group consisting of In, Cr, Bi and Si.

34. The optical disk according to claim 22 wherein the phase-change material in the first and second recording layers of the optical disk is a mixture of one or more oxides selected from the group consisting of $TeO_x$, $GeO_x$, $SbO_x$ and $InO_x$ and one or more metals selected from the group consisting of Pd, Ni and Cu.

35. The optical disk according to claim 22 wherein the phase-change material in the first and second recording layers of the optical disk consists essentially of a material selected from the group consisting of GeTe, SnTe, PbTe, SbSe, $Sb_2Se_3$, $Sb_{(1-x)}Se$ with $0<x<0.4$, $Bi_2Se$, $Sbi_2Se_3$, $Bi_2Te$, BiTe, $Bi_2Te_3$, $Sb_2Te$, SbTe, $Sb_2Te_3$, TeSi, $Ag_2Se$, $AgSe_2$, $Ag_2Te$, $Ag_3Te_2$, $AgTe_2$, $Au_2Se_3$, $AuTe_2$, GaSb, and GeSe.

36. The optical disk according to claim 22 wherein the phase-change material in the first and second recording layers of the optical disk consists essentially of a material selected from the group consisting of $GeSb_2Te_4$, $Ge_2Sb_2Te5$, $GeSb_4Te_7$, $In_3SbTe_2$, and $(InSb)_{1-x}(GaSb)_x$ where $0.5<x<=1$.

37. The optical disk according to claim 22 wherein the optical interference film of the optical disk comprises an oxide, nitride or carbide of Si.

38. The optical disk according to claim 22 wherein the optical interference film of the optical disk comprises an oxide or nitride of an element selected from the group consisting of Al, Ti, Zr, Cu, Hf, Ta, Nb, Cr and W.

39. The optical disk according to claim 22 wherein the optical interference film of the optical disk comprises Zn or Cr mixed with one or more of the elements selected from group consisting of S, Se and Te.

40. The optical disk according to claim 22 further comprising a third recording layer of phase-change write-once material located between the first and second recording layers and a second optical interference film in contact with the third recording layer and transmissive to the light, the second optical interference film having an index of refraction significantly different from the index of refraction of the third recording layer and a thickness sufficient to provide constructive interference of the light, the third recording layer and the second optical interference film in contact with it providing a light transmission of greater than approximately 25 percent.

* * * * *